United States Patent
Takahashi

(10) Patent No.: US 9,914,822 B2
(45) Date of Patent: Mar. 13, 2018

(54) RUBBER COMPOSITION AND PNEUMATIC TIRE

(71) Applicant: TOYO TIRE & RUBBER CO., LTD., Osaka-shi, Osaka (JP)

(72) Inventor: Hiroyuki Takahashi, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 0 days.

(21) Appl. No.: 15/292,853

(22) Filed: Oct. 13, 2016

(65) Prior Publication Data

US 2017/0107360 A1 Apr. 20, 2017

(30) Foreign Application Priority Data

Oct. 16, 2015 (JP) ................. 2015-204648

(51) Int. Cl.
  *C08L 9/00* (2006.01)
  *C08L 15/00* (2006.01)
  *C08L 9/06* (2006.01)
  *B60C 1/00* (2006.01)

(52) U.S. Cl.
  CPC ...... *C08L 9/06* (2013.01); *B60C 1/00* (2013.01); *C08L 15/00* (2013.01); *C08L 2205/025* (2013.01); *C08L 2205/035* (2013.01); *Y02T 10/862* (2013.01)

(58) Field of Classification Search
None
See application file for complete search history.

(56) References Cited

U.S. PATENT DOCUMENTS

| 4,894,420 A | 1/1990 | Scriver |
| 2005/0288441 A1 | 12/2005 | Kanenari |
| 2014/0100321 A1 | 4/2014 | Maejima et al. |

FOREIGN PATENT DOCUMENTS

| JP | 2-114003 A | 4/1990 |
| JP | 2000-302915 A | 10/2000 |
| JP | 2010-43166 A | 2/2010 |
| JP | 2013-10967 A | 1/2013 |
| WO | 2005/005546 A1 | 1/2005 |
| WO | 2016/120211 A1 * | 8/2016 |

* cited by examiner

*Primary Examiner* — Ana L Woodward
(74) *Attorney, Agent, or Firm* — Westerman, Hattori, Daniels & Adrian, LLP

(57) ABSTRACT

A rubber composition comprises 100 parts by mass of a diene rubber component comprising at least one selected from the group consisting of styrene-butadiene rubber, polybutadiene rubber, natural rubber and polyisoprene rubber, the diene rubber component containing modified styrene-butadiene rubber modified with a functional group having an interaction with a silanol group on a surface of silica, from 20 to 120 parts by mass of silica, and from 3 to 30 parts by mass of hydrogenated non-modified nitrile rubber. A pneumatic tire has a rubber part comprising the rubber composition.

12 Claims, No Drawings

RUBBER COMPOSITION AND PNEUMATIC TIRE

CROSS-REFERENCE TO RELATED APPLICATIONS

This application is based upon and claims the benefit of priority from the prior Japanese Patent Application No. 2015-204648, filed on Oct. 16, 2015; the entire contents of which are incorporated herein by reference.

BACKGROUND

1. Technical Field

The present embodiment relates to a rubber composition and a pneumatic tire using the rubber composition.

2. Related Art

A tire is required to have excellent grip performance on a wet road surface (wet performance). On the other hand, in recent tires, the requirement to low fuel consumption is high, and excellent rolling resistance performance, that is, low rolling resistance, is required. However, those performances are conflicting characteristics, and are generally difficult to achieve simultaneously.

JP-A-02-114003 discloses a blend of cis-1,4-polyisoprene rubber and isoprene-acrylonitrile rubber or butadiene-acrylonitrile rubber in order to obtain a tread having balanced viscoelasticity relating to wet performance and rolling resistance performance. JP-A-2000-302915 discloses a rubber composition in which to obtain a tread rubber having high hysteresis loss and excellent abrasion resistance, other diene rubber is added to acrylonitrile-butadiene rubber (NBR) in a carbon black formulation so that carbon black is not incorporated into an NBR phase. Those patent documents disclose a blend of NBR and other diene rubber, but do not disclose using hydrogenated rubber as NBR.

JP-A-2010-043166 discloses that to achieve high abrasion resistance without deteriorating rolling resistance, carboxyl-modified acrylonitrile-butadiene rubber (NBR) is added to a silica formulation, and discloses that a hydrogenated rubber may be used as the carboxyl-modified NBR. However, this patent document uses NBR modified with a carboxyl group having an interaction with silica for the purpose of incorporating silica into NBR, and does not disclose using a rubber obtained by hydrogenating non-modified NBR.

On the other hand, WO2005/005546 discloses that a polar polymer is added to a rubber component such as natural rubber in order to improve bloom resistance of a crosslinking agent, and discloses that hydrogenated nitrile rubber (HNBR) is used as the polar polymer. However, this patent document does not disclose that modified styrene-butadiene rubber having an interaction with silica is used as a rubber component to be combined with hydrogenated nitrile rubber.

JP-A-2013-010967 discloses that a crosslinkable polymer and three-dimensionally crosslinked fine particles are added to a rubber composition containing a diene rubber and carbon black and/or silica in order to improve on-ice performance and abrasion resistance. This patent document further describes that a rubber modified with an amino group, an alkoxyl group or the like may be used as the diene rubber, and fine particles obtained by three-dimensionally crosslinking a saturated hydrocarbon polymer or copolymer such as hydrogenated nitrile rubber may be used as the fine particles. However, the polymer that forms the fine particles is required to have a reactive functional group such as a hydroxyl group or a silane functional group in order to three-dimensionally crosslink the polymer. From the standpoint of this, it does not say that this patent document discloses adding non-modified hydrogenated NBR to a rubber composition, and this patent document does not suggest the advantageous effects by the combination with modified styrene-butadiene rubber.

SUMMARY

In view of the above, an object of the present embodiment is to provide a rubber composition that can enhance the effect for achieving both wet performance and rolling resistance performance.

The rubber composition according to the present embodiment comprises 100 parts by mass of a diene rubber component comprising at least one selected from the group consisting of styrene-butadiene rubber, polybutadiene rubber, natural rubber and polyisoprene rubber, the diene rubber component containing modified styrene-butadiene rubber modified with a functional group having an interaction with a silanol group on a surface of silica, from 20 to 120 parts by mass of silica, and from 3 to 30 parts by mass of hydrogenated non-modified nitrile rubber.

A pneumatic tire according to the present embodiment is manufactured using the rubber composition.

DETAILED DESCRIPTION

The rubber composition according to the present embodiment comprises (A) a diene rubber component containing modified styrene-butadiene rubber, (B) silica and (C) hydrogenated non-modified nitrile rubber.

According to the present embodiment, the effect for achieving both wet performance and rolling resistance performance can be enhanced by using both modified styrene-butadiene rubber and hydrogenated non-modified nitrile rubber. The reason for this is considered as follows (however, the reason does not intend to limit the present embodiment).

Nitrile rubber (NBR) generally has high polarity as compared with a diene rubber such as styrene-butadiene rubber (SBR) or butadiene rubber (BR), and is difficult to be miscible with the diene rubber. Therefore, for example, when SBR has been mixed with NBR, tan δ peak by NBR having high glass transition point appears at a high temperature side of tan δ peak by SBR in a graph showing temperature dependency of loss tangent tan δ. Tan δ in the vicinity of 0° C. increases by the tan δ peak by NBR, and this can contribute to the improvement of wet performance. However, a rubber polymer generally has the tendency that its tan δ peak decreases and becomes broad by incorporating a filler such as silica therein. When the tan δ peak of NBR decreases and becomes broad, tan δ in the vicinity of 0° that contributes to the improvement of wet performance decreases and tan δ in the vicinity of 60° that is related to the improvement of rolling resistance performance increases. As a result, the balance between wet performance and rolling resistance performance is impaired. For this reason, in order to enhance the effect for achieving both wet performance and rolling resistance performance by adding NBR, it is considered to be desirable that silica is suppressed from mixing into NBR.

According to the present embodiment, modified styrene-butadiene rubber that is easy to incorporate silica therein is used as the diene rubber component (A), and hydrogenated non-modified nitrile rubber (C) is used as NBR to be used together with the modified styrene-butadiene rubber. As a result, the silica (B) can be further preferentially distributed unevenly in the diene rubber component (A). In more detail, because non-modified NBR is used, the silica (B) can be suppressed from mixing into the component (C). Silica is generally incorporated in a rubber polymer through a silane coupling agent, and its reaction requires a double bond in the rubber polymer. Incorporation effect by a silane coupling agent is not obtained by hydrogenating a butadiene unit in NBR, and therefore, the silica (B) can be suppressed from mixing into the component (C). It is considered from the above that decrease and broadening of tan δ peak of NBR can be suppressed, and as a result, the effect for achieving both wet performance and rolling resistance performance can be enhanced.

(A) Diene Rubber Component

In the present embodiment, the diene rubber component (A) comprises at least one selected from the group consisting of styrene-butadiene rubber (SBR), polybutadiene rubber (BR), natural rubber (NR) and polyisoprene rubber (IR). The diene rubber component (A) contains modified styrene-butadiene rubber (hereinafter referred to as "modified SBR") modified with a functional group having an interaction with a silanol group on a surface of silica as SBR.

Therefore, the diene rubber component (A) may be modified SBR alone, and may be a blend of modified SBR and other diene rubber (that is, at least one selected from the group consisting of BR, NR, IR and non-modified SBR). The other diene rubber to be added to modified SBR may be at least one selected from the group consisting of non-modified SBR, non-modified BR and modified BR as one embodiment, and may be non-modified SBR and non-modified BR as other embodiment.

When the present specification simply refers to styrene-butadiene rubber (SBR), polybutadiene rubber (BR), natural rubber (NR) and polyisoprene rubber (IR) and there is no distinction between modified rubbers and non-modified rubbers, those terms are used in a concept that both modified rubbers and non-modified rubbers are included. Furthermore, the term "non-modified" is used to be the same meaning as "unmodified".

The content of the modified SBR occupied in the diene rubber component (A) is not particularly limited. As one embodiment, the modified SBR may be contained in an amount of occupying from 30 to 100 parts by mass, and preferably from 30 to 70 parts by mass, of 100 parts by mass of the diene rubber component (A). Therefore, the other diene rubber may be contained in an amount of occupying from 0 to 70 parts by mass, and preferably from 30 to 70 parts by mass, of 100 parts by mass of the diene rubber component (A).

The modified SBR is styrene-butadiene rubber modified with a functional group having an interaction (reactivity and affinity) with a silanol group on a surface of silica. The silica (B) is more easily incorporated in the diene rubber component (A) by containing the modified SBR having such a functional group in the diene rubber component (A), and mixing the silica (B) into the hydrogenated non-modified nitrile rubber (C) can be reduced.

The functional group of the modified SBR is at least one selected from the group consisting of a hydroxyl group, an amino group, an amide group, a carboxyl group, a carboxylic acid derivative group, an alkoxyl group, a silyl group, an alkoxysilyl group, an epoxy group, a thiol group, an imino group, an imidazole group, a urea group and pyridyl group. The modified SBR is SBR modified with the functional group by that the functional group is introduced into its molecular terminal or molecular chain. As the preferred embodiment, the functional group may be at least one selected from the group consisting of a hydroxyl group, an amino group, a carboxyl group, an alkoxyl group and an alkoxysilyl group, and preferably at least one selected from the group consisting of a hydroxyl group, an amino group and an alkoxyl group.

The amino group used herein is not only a primary amino group, but may be a secondary or tertiary amino group. In the case of a secondary or tertiary amino group, the carbon number in a hydrocarbon group as a substituent is preferably 15 or less in total. Examples of the amide group include acid amide groups such as a carboxylic acid amide group or a sulfonic acid amide group, and a carboxylic acid amide group is preferred. The amide group may be a primary amide group, a secondary amide group or a tertiary amide group. Examples of the carboxyl group include groups derived from carboxylic acid such as maleic acid, phthalic acid, acrylic acid or methacrylic acid. Examples of the carboxylic acid derivative group include a carboxylic acid ester group that is an ester group derived from those carboxylic acids, and a carboxylic acid anhydride group comprising an anhydride of dicarboxylic acid such as maleic acid or phthalic acid. Examples of the alkoxyl group include a methoxy group and an ethoxy group, represented by —OR (wherein R represents, for example, an alkyl group having from 1 to 4 carbon atoms). The silyl group is a group represented by —SiR$_3$ (wherein R represents, for example, a hydrogen atom or an alkyl group having from 1 to 4 carbon atoms, and three Rs may be the same or different), and examples thereof include alkyl silyl groups such as a trimethylsilyl group, a triethylsilyl group or a tert-butyldimethylsilyl group. The alkoxysilyl group is a group in which at least one of three hydrogens or alkyl groups in the above silyl group is substituted with an alkoxyl group, and examples thereof include a trialkoxysilyl group and an alkyl dialkoxysilyl group. The imino group is a divalent group represented by =NR or —NR— (wherein R represents, for example, a hydrogen atom or an alkyl group having from 1 to 4 carbon atoms). The urea group is represented by —NH—CO—NH—. The epoxy group, imidazole group and pyridyl group may have at least one of substituent in a hetero ring, respectively.

The glass transition temperature (Tg) of the modified SBR is not particularly limited, and may be, for example, from −70 to −10° C., and preferably from −60 to −20° C. The styrene content (St) in the modified SBR is not particularly limited, and may be, for example, from 5 to 50 mass %, and preferably from 10 to 40 mass %. The glass transition temperature is a value measured by a differential scanning calorimetry (DSC) in a temperature rising rate of 20° C./min (measuring temperature range: −150 to 50° C.) according to JIS K7121. The styrene content is a value calculated from an integrated ratio of $^1$HNMR spectrum.

(B) Silica

In the present embodiment, the silica (B) as a filler is not particularly limited, but wet silica such as wet precipitated silica or wet gelled silica is preferably used. Colloidal properties of the silica (B) are not particularly limited. For example, silica having nitrogen adsorption specific surface area (BET) by BET method of from 90 to 250 m$^2$/g, and preferably from 150 to 230 m$^2$/g, may be used. BET of the silica is measured according to BET method defined in ISO 5794.

The content of the silica (B) in the rubber composition is from 20 to 120 parts by mass, preferably from 30 to 100 parts by mass, and more preferably from 40 to 80 parts by mass, per 100 parts by mass of the diene rubber component (A). When the content of the silica (B) is 20 parts by mass or more, sufficient reinforcing effect can be exhibited, and when the content is 120 parts by mass or less, deterioration of processability can be suppressed.

(C) Hydrogenated Non-Modified Nitrile Rubber

The hydrogenated non-modified nitrile rubber (hereinafter referred to as non-modified HNBR) used in the present embodiment is obtained by hydrogenating non-modified nitrile rubber (that is, non-modified acrylonitrile-butadiene rubber). Therefore, the non-modified HNBR has a nitrile group, but does not have any other functional group containing a hetero atom. The non-modified HNBR has low compatibility with the diene rubber component (A). Therefore, the rubber composition has a sea-island structure in which the diene rubber component (A) is a continuous phase (matrix) and the non-modified HNBR is a disperse phase. As described above, the silica (B) is dispersed in the continuous phase comprising the diene rubber component (A), and on the other hand, the silica (B) is suppressed from mixing into the disperse phase comprising the non-modified HNBR (C). In the present embodiment, the non-modified HNBR (C) is not three-dimensionally crosslinked. In other words, the non-modified HNBR (C) that is not three-dimensionally crosslinked is mixed with the diene rubber component (A).

The amount of bound acrylonitrile in the non-modified HNBR (C) is not particularly limited, and may be, for example, from 10 to 60 mass %, preferably from 15 to 50 mass %, more preferably from 25 to 50 mass %, and still more preferably from 30 to 45 mass %. The amount of bound acrylonitrile is measured by a semimicro-Kjeldahl method according to JIS K6384.

The non-modified HNBR (C) is obtained by adding hydrogen to a double bond of a butadiene unit in the non-modified nitrile rubber. As one embodiment, an iodine value of the non-modified HNBR (C) as an index of the degree of hydrogenation may be 30 mg/100 mg or less, preferably 20 mg/100 mg or less, and more preferably 15 mg/100 mg or less. The iodine value used herein is measured according to JIS K6235.

The amount of the non-modified HNBR (C) in the rubber composition is preferably from 3 to 30 parts by mass, and more preferably from 5 to 25 parts by mass, per 100 parts by mass of the diene rubber component (A). When the content of the non-modified HNBR (C) is 3 parts by mass or more, the improvement effect of wet performance can be enhanced, and on the other hand, when the content is 30 parts by mass or less, deterioration of abrasion resistance can be suppressed. The non-modified HNBR (C) is not included in the diene rubber component (A).

(D) Silane Coupling Agent

The silane coupling agent (D) may be added to the rubber composition according to the present embodiment. The amount of the silane coupling agent (D) added is not particularly limited, but is preferably from 2 to 25 parts by mass per 100 parts by mass of the silica (B). The silane coupling agent (D) is not particularly limited, and examples thereof include a sulfide silane coupling agent such as bis(3-triethoxysilylpropyl)tetrasulfide, bis(3-triethoxysilylpropyl)disulfide, bis(2-triethoxysilylethyl)tetrasulfide or bis(3-trimethoxysilylpropyl)tetrasulfide; a mercaptosilane coupling agent such as 3-mercaptopropyltrimethoxysilane, 3-mercaptopropyltriethoxysilane or 3-mercaptopropylmethyldimethoxysilane; and a protected mercaptosilane coupling agent such as 3-octanoylthio-1-propyltriethoxysilane or 3-propionylthiopropyltrimethoxysilane. Those can be used alone or as mixtures of two or more thereof.

Other Components

In the rubber composition according to the present embodiment, the silica (B) may be used alone as a filler, but carbon black may be used together with the silica (B). When the silica (B) and carbon black are used together, the proportion of the silica (B) in the entire filler is preferably 50 mass % or more, and more preferably 70 mass % or more. The carbon black can be added for the purpose of, for example, coloration of a tire, and in this case, the amount of the carbon black added is preferably from 2 to 10 parts by mass per 100 parts by mass of the diene rubber component (A).

The rubber composition according to the present embodiment can further contain various additives generally used in a rubber composition, such as an oil, a wax, stearic acid, zinc flower, an age resister, a vulcanizing agent or a vulcanization accelerator, other than the above-described components.

The vulcanizing agent is not particularly limited, and examples thereof include sulfurs such as powdered sulfur, precipitated sulfur, colloidal sulfur, insoluble sulfur or highly dispersible sulfur. Those can be used alone or as mixtures of two or more thereof. The amount of the sulfur added may be, for example, from 0.1 to 10 parts by mass, and preferably from 0.5 to 5 parts by mass, per 100 parts by mass of the diene rubber component (A). The amount of the vulcanization accelerator added may be, for example, from 0.1 to 7 parts by mass, and preferably from 0.5 to 5 parts by mass, per 100 parts by mass of the diene rubber component (A).

The rubber composition according to the present embodiment can be prepared by kneading the necessary components according to the conventional method using a mixing machine generally used, such as Banbury mixer, a kneader or rolls. Specifically, other additives excluding a vulcanizing agent and a vulcanization accelerator are added to the diene rubber component (A) together with the silica (B), the non-modified HNBR (C) and the silane coupling agent (D), followed by mixing, in a first mixing step. A vulcanizing agent and a vulcanization accelerator are then added to the mixture thus obtained, followed by kneading, in a final mixing step. Thus, a rubber composition can be prepared.

The rubber composition according to the present embodiment can be used in various rubber compositions for forming a rubber part such as a pneumatic tire, an anti-vibration rubber or a conveyer belt. The rubber composition is preferably used as a rubber composition for a tire. Examples of the tire include pneumatic tires having various uses and sizes, such as tires for passenger cars or heavy load tires for trucks or buses. The pneumatic tire according to one embodiment has a rubber part comprising the rubber composition. A site of a tire to which the rubber composition is applied is, for example, a tread rubber or a side wall rubber. The rubber composition is preferably used in a tread rubber. The tread rubber of a pneumatic tire includes a tread rubber comprising a two layer structure of a cap rubber and a base rubber, and a tread rubber comprising an integrated single layer structure of those, and in each case, the rubber composition is preferably used in a rubber constituting a ground contact surface. That is, in the case of a single layer structure, the tread rubber preferably comprises the rubber composition, and in the case of a two layer structure, the cap rubber preferably comprises the rubber composition.

A method for manufacturing a pneumatic tire is not particularly limited. For example, the pneumatic tire can be manufactured by molding the rubber composition into a given shape by extrusion processing according to the conventional method, combining it with other parts to manufacture an unvulcanized tire (green tire), and then vulcanization molding the unvulcanized tire at a temperature of, for example, from 140 to 180° C.

EXAMPLES

Examples of the present embodiment are described below, but the present embodiment is not construed as being limited to those examples.

Banbury mixer was used. Compounding ingredients other than sulfur and a vulcanization accelerator were added to and mixed with a diene rubber according to the formulations (parts by mass) shown in Table 1 below in a first mixing step (discharge temperature: 160° C.). Sulfur and a vulcanization accelerator were added to and mixed with the mixture thus obtained in a final mixing step (discharge temperature: 90° C.). Thus, a rubber composition for a tire tread was prepared. The details of each component in Table 1 are as follows.

Non-modified SBR-1: Non-modified emulsion-polymerized styrene-butadiene rubber, "JSR0122" manufactured by JSR Corporation (St: 37 mass %, Tg: −40° C., oil extension amount by aroma oil: 34 phr)

Modified SBR: Terminal alkoxyl group- and amino group-modified solution-polymerized styrene-butadiene rubber, "HPR340" manufactured by JSR Corporation (St: 10 mass %, Tg: −58° C.)

Non-modified SBR-2: Non-modified emulsion-polymerized styrene-butadiene rubber, "JSR1502" manufactured by JSR Corporation (St: 23.5 mass %, Tg: −51° C.)

Non-modified BR: Non-modified polybutadiene rubber, "BR150B" manufactured by Ube Industries, Ltd.

Non-modified NBR: Non-modified nitrile rubber (unhydrogenated), "JSR N220S" manufactured by JSR Corporation (amount of bound acrylonitrile: 41.5 mass %)

Non-modified HNBR: "ZETPOL 1010" manufactured by Zeon Corporation (amount of bound acrylonitrile: 44.2 mass %, iodine value: 10 mg/100 mg)

Modified HNBR: Carboxyl group-modified hydrogenated nitrile rubber, "VPKA 8889" manufactured by LANXESS Carbon black: N339, "SEAST KH" manufactured by Tokai Carbon Co., Ltd.

Silica: "NIPSIL AQ" manufactured by Tosoh Silica Corporation (BET: 205 m$^2$/g)

Silane coupling agent: Sulfide silane coupling agent "Si75" manufactured by Evonik Oil: "PROCESS NC140" manufactured by JX Nippon Oil & Sun-Energy Corporation Wax: "OZOACE 0355" manufactured by Nippon Seiro Co., Ltd.

Stearic acid: "LUNAC S-20" manufactured by Kao Corporation

Zinc flower: "Zinc Flower #1" manufactured by Mitsui Mining & Smelting Co., Ltd.

Age resister: "NOCRAC 6C" manufactured by Ouchi Shinko Chemical Co., Ltd.

Vulcanization accelerator 1: DPG, "NOCCELER D" manufactured by Ouchi Shinko Chemical Co., Ltd.

Vulcanization accelerator 2: CBS, "SOXINOL CZ" manufactured by Sumitomo Chemical Co., Ltd.

Sulfur: "SULFUR POWDER" manufactured by Tsurumi Chemical Industry Co., Ltd.

A test piece having a given shape was prepared by vulcanizing each rubber composition obtained at 150° C. for 30 minutes. Using each test piece, wet performance, rolling resistance performance and abrasion resistance were evaluated. The evaluation methods are as follow.

Wet performance: Loss factor tan δ was measured under the conditions of frequency: 10 Hz, static strain: 10%, dynamic strain: ±1% and temperature: 0° C. using a viscoelasticity tester manufactured by Toyo Seiki Seisaku-Sho Ltd., and wet performance was indicated by an index as the value of Comparative Example 1 being 100. Tan δ is large as the index is large, and large index shows excellent wet performance when used in a tire. It says that when the index is 105 or more, the improvement effect was obtained, and when the index is 95 or less, wet performance was deteriorated.

Rolling resistance performance: Loss factor tan δ was measured under the conditions of frequency: 10 Hz, static strain: 10%, dynamic strain: ±1% and temperature: 60° C. using a viscoelasticity tester manufactured by Toyo Seiki Seisaku-Sho Ltd., and rolling resistance performance was indicated by an index as the value of Comparative Example 1 being 100. Tan δ is small as the index is small, and low heat generation property is excellent. Therefore, small index shows that rolling resistance when used in a tire is small and low fuel consumption is excellent. It says that when the index is 95 or less, the improvement effect was obtained, and when the index is 105 or more, rolling resistance performance was deteriorated.

Abrasion resistance: Abrasion loss was measured under the conditions of load: 40N and slip ratio: 30% according to JIS K6264 using Lambourn abrasion tester manufactured by Iwamoto Seisakusho, and was indicated by an index in the form of an inverse number of abrasion loss as the value of Comparative Example 1 being 100. The results show that abrasion loss is small as the index is large and abrasion resistance is excellent. It says that when the index is 110 or more, the improvement effect was obtained and when the index is 90 or less, abrasion resistance was deteriorated.

TABLE 1

|  | Com. Ex. 1 | Com. Ex. 2 | Com. Ex. 3 | Com. Ex. 4 | Com. Ex. 5 | Com. Ex. 6 | Ex. 1 | Ex. 2 | Ex. 3 |
|---|---|---|---|---|---|---|---|---|---|
| Formulation (parts by mass) | | | | | | | | | |
| Non-modified SBR-1 | 40.2 (30) | 40.2 (30) | 40.2 (30) | 40.2 (30) | 40.2 (30) | 40.2 (30) | 40.2 (30) | 40.2 (30) | 40.2 (30) |
| Modified SBR | 50 | 50 | 50 | 50 | | 50 | 50 | 50 | 50 |
| Non-modified SBR-2 | | | | | 50 | | | | |
| Non-modified BR | 20 | 20 | 20 | 20 | 20 | 20 | 20 | 20 | 20 |

TABLE 1-continued

| | Com. Ex. 1 | Com. Ex. 2 | Com. Ex. 3 | Com. Ex. 4 | Com. Ex. 5 | Com. Ex. 6 | Ex. 1 | Ex. 2 | Ex. 3 |
|---|---|---|---|---|---|---|---|---|---|
| Non-modified NBR | | 10 | | | | | | | |
| Non-modified HNBR | | | 2 | 35 | 10 | | 5 | 10 | 20 |
| Modified HNBR | | | | | | 10 | | | |
| Carbon black | 5 | 5 | 5 | 5 | 5 | 5 | 5 | 5 | 5 |
| Silica | 60 | 60 | 60 | 60 | 60 | 60 | 60 | 60 | 60 |
| Silane coupling agent | 4.8 | 4.8 | 4.8 | 4.8 | 4.8 | 4.8 | 4.8 | 4.8 | 4.8 |
| Oil | 4.8 | 4.8 | 4.8 | 4.8 | 4.8 | 4.8 | 4.8 | 4.8 | 4.8 |
| Wax | 2 | 2 | 2 | 2 | 2 | 2 | 2 | 2 | 2 |
| Stearic acid | 2 | 2 | 2 | 2 | 2 | 2 | 2 | 2 | 2 |
| Zinc flower | 2 | 2 | 2 | 2 | 2 | 2 | 2 | 2 | 2 |
| Age resister | 2 | 2 | 2 | 2 | 2 | 2 | 2 | 2 | 2 |
| Vulcanization accelerator 1 | 0.5 | 0.5 | 0.5 | 0.5 | 0.5 | 0.5 | 0.5 | 0.5 | 0.5 |
| Vulcanization accelerator 2 | 1.5 | 1.5 | 1.5 | 1.5 | 1.5 | 1.5 | 1.5 | 1.5 | 1.5 |
| Sulfur | 2 | 2 | 2 | 2 | 2 | 2 | 2 | 2 | 2 |
| Evaluation (index) | | | | | | | | | |
| Wet performance | 100 | 104 | 100 | 120 | 107 | 104 | 107 | 109 | 113 |
| Rolling resistance performance | 100 | 102 | 100 | 107 | 106 | 101 | 98 | 102 | 103 |
| Abrasion resistance | 100 | 96 | 100 | 88 | 102 | 105 | 100 | 97 | 96 |

* Regarding the amount of non-modified SBR-1, the value in the parenthesis is parts by mass of a polymer excluding an oil for oil extension The results obtained are shown in Table 1. As compared with Comparative Example 1 as a control, in Comparative Example 2 in which non-modified NBR that was not hydrogenated was added, the improvement effect of wet performance was small. This is considered due to that because NBR is not hydrogenated, silica was incorporated in NBR phase through a silane coupling agent. In Comparative Example 3, non-modified HNBR was added, but its addition amount was small. As a result, the improvement effect in balance between wet performance and rolling resistance performance was not obtained. In Comparative Example 4, the amount of the non-modified HNBR added was too large. Therefore, the improvement effect of wet performance was excellent, but abrasion resistance was deteriorated. In Comparative Example 5, non-modified HNBR was added, but non-modified SBR-2 was used in place of modified SBR. Therefore, rolling resistance performance was deteriorated. This is considered due to that because SBR is not modified, uneven distribution effect of the silica (B) into the diene rubber component (A) was decreased. In Comparative Example 6, modified HNBR, not non-modified HNBR, was added. Therefore, the improvement effect of wet performance was small. This is considered due to that mixing silica into HNBR phase was accelerated by a carboxyl group of modified HNBR. On the other hand, in Examples 1 to 3 in which modified SBR and non-modified HNBR were used together, wet performance could be improved while suppressing deterioration of rolling resistance performance and abrasion resistance.

While certain embodiments have been described above, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rubber composition comprising:
   100 parts by mass of a diene rubber component comprising:
   modified styrene-butadiene rubber modified with a functional group having an interaction with a silanol group on a surface of silica, and
   optionally one or more components selected from the group consisting of styrene-butadiene rubber, polybutadiene rubber, natural rubber and polyisoprene rubber,
   the rubber composition further comprising:
   from 20 to 120 parts by mass of silica, and
   from 3 to 30 parts by mass of hydrogenated non-modified nitrile rubber.

2. The rubber composition according to claim 1, wherein the modified styrene-butadiene rubber is contained in an amount of occupying from 30 to 100 parts by mass of 100 parts by mass of the diene rubber component.

3. The rubber composition according to claim 1, further comprising a silane coupling agent in an amount of from 2 to 25 parts by mass per 100 parts by mass of the silica.

4. The rubber composition according to claim 1, wherein the functional group of the modified styrene-butadiene rubber is at least one selected from the group consisting of a hydroxyl group, an amino group, an amide group, a carboxyl group, a carboxylic acid derivative group, an alkoxyl group, a silyl group, an alkoxysilyl group, an epoxy group, a thiol group, an imino group, an imidazole group, a urea group and pyridyl group.

5. The rubber composition according to claim 1, wherein the diene rubber component is the modified styrene-butadiene rubber alone or a blend of the modified styrene-butadiene rubber and at least one other diene rubber selected from the group consisting of polybutadiene rubber, natural rubber, polyisoprene rubber and non-modified styrene-butadiene rubber.

6. The rubber composition according to claim 5, wherein the other diene rubber is at least one selected from the group consisting of non-modified styrene-butadiene rubber, non-modified polybutadiene rubber and modified polybutadiene rubber.

7. The rubber composition according to claim 1, wherein the modified styrene-butadiene rubber has a glass transition temperature of from −70 to −10° C.

8. The rubber composition according to claim 1, wherein the hydrogenated non-modified nitrile rubber contains from 10 to 60 mass % of bound acrylonitrile, and has an iodine value of 30 mg/100 mg or less.

9. A pneumatic tire having a rubber part comprising the rubber composition according to claim 1.

10. The pneumatic tire according to claim 9, wherein the rubber part is a tread rubber.

11. The rubber composition according to claim 1, having a sea-island structure in which the diene rubber component is a continuous phase and the hydrogenated non-modified nitrile rubber is a disperse phase, wherein the silica is preferentially distributed unevenly in the diene rubber component, and the silica is suppressed from mixing into the hydrogenated non-modified nitrile rubber.

12. The rubber composition according to claim 1, wherein the functional group of the modified styrene-butadiene rubber is at least one selected from the group consisting of an amino group and an alkoxyl group.

* * * * *